(12) United States Patent
Hiroshige et al.

(10) Patent No.: US 7,167,595 B2
(45) Date of Patent: Jan. 23, 2007

(54) IMAGE PROCESSING APPARATUS AND RECORDING MEDIUM, AND IMAGE PROCESSING APPARATUS

(75) Inventors: Akira Hiroshige, Nagano (JP); Yoshihiro Nakami, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 622 days.

(21) Appl. No.: 10/087,928

(22) Filed: Mar. 5, 2002

(65) Prior Publication Data

US 2002/0159650 A1 Oct. 31, 2002

Related U.S. Application Data

(63) Continuation of application No. PCT/JP01/05915, filed on Jul. 6, 2001.

(30) Foreign Application Priority Data

Jul. 6, 2000 (JP) ............................ P2000-204928

(51) Int. Cl.
*G06K 9/40* (2006.01)

(52) U.S. Cl. ...................... 382/266; 382/260; 382/275; 382/269; 382/274; 358/3.26; 358/3.27; 358/463

(58) Field of Classification Search ................ 382/260, 382/266, 269, 274, 275; 358/3.26, 3.27, 358/532, 463, 520
See application file for complete search history.

(56) References Cited

U.S. PATENT DOCUMENTS

| | | | | |
|---|---|---|---|---|
| 5,216,477 A | * | 6/1993 | Korb | .......................... 356/28.5 |
| 5,270,728 A | * | 12/1993 | Lund et al. | ..................... 347/5 |
| 5,293,579 A | * | 3/1994 | Stockholm | .................. 382/269 |
| 5,337,159 A | * | 8/1994 | Iida et al. | ..................... 358/447 |
| 5,345,327 A | * | 9/1994 | Savicki | ........................ 398/212 |
| 5,351,305 A | * | 9/1994 | Wood et al. | ................. 382/128 |
| 5,442,462 A | * | 8/1995 | Guissin | ........................ 358/463 |
| 5,631,974 A | * | 5/1997 | Lau-Kee et al. | ............. 382/132 |
| 5,729,290 A | * | 3/1998 | Tokumitsu et al. | .......... 348/349 |
| 5,742,642 A | * | 4/1998 | Fertner | ........................ 375/233 |
| 6,069,984 A | * | 5/2000 | Sadler et al. | ................ 382/321 |
| 6,173,084 B1 | * | 1/2001 | Aach et al. | .................. 382/260 |
| 6,377,313 B1 | * | 4/2002 | Yang et al. | .................. 348/630 |
| 6,559,974 B1 | * | 5/2003 | Morisita | ...................... 358/1.9 |

* cited by examiner

*Primary Examiner*—Samir Ahmed
*Assistant Examiner*—Yosef Kassa
(74) *Attorney, Agent, or Firm*—Sughrue Mion, PLLC

(57) ABSTRACT

The edge of an image is extracted, and edge information that includes the grade and the direction of the slope of the edge is obtained. The smoothing strength is calculated using the luminance of a pixel, and filter information is selected from the obtained edge information and the obtained smoothing strength. Then, digital data is smoothed by using the selected filter information. Since the filter information is set in advance, a fast smoothing process is implemented by selecting appropriate filter information. Further, the information for a smoothing range describes an elliptical shape when the slope is large, and the smoothing range is inclined in accordance with the direction of the slope. Therefore, noise near the edge can be thoroughly removed.

18 Claims, 9 Drawing Sheets

| 0 | 0 | 0 | 0 | 0 |
|---|---|---|---|---|
| 0 | 3 | 21 | 3 | 0 |
| 0 | 21 | 158 | 21 | 0 |
| 0 | 3 | 21 | 3 | 0 |
| 0 | 0 | 0 | 0 | 0 |

/254

σ = 0.5, n = 3, m = 1, θg = 45°

| 0 | 0 | 0 | 0 | 0 |
|---|---|---|---|---|
| 0 | 5 | 0 | 0 | 0 |
| 0 | 0 | 247 | 0 | 0 |
| 0 | 0 | 0 | 5 | 0 |
| 0 | 0 | 0 | 0 | 0 |

/257

σ = 0.7, n = 1, m = 1, θg = 45°

| 0 | 1 | 1 | 1 | 0 |
|---|---|---|---|---|
| 1 | 11 | 30 | 11 | 1 |
| 1 | 30 | 83 | 30 | 1 |
| 1 | 11 | 30 | 11 | 1 |
| 0 | 1 | 1 | 1 | 0 |

/259

σ = 0.7, n = 3, m = 1, θg = 45°

| 0 | 0 | 0 | 0 | 0 |
|---|---|---|---|---|
| 0 | 26 | 1 | 0 | 0 |
| 0 | 1 | 199 | 1 | 0 |
| 0 | 0 | 1 | 26 | 0 |
| 0 | 0 | 0 | 0 | 0 |

/255

σ = 0.8, n = 1, m = 1, θg = 45°

| 0 | 1 | 3 | 1 | 0 |
|---|---|---|---|---|
| 1 | 13 | 29 | 13 | 1 |
| 3 | 29 | 64 | 29 | 3 |
| 1 | 13 | 29 | 13 | 1 |
| 0 | 1 | 3 | 1 | 0 |

/252

σ = 0.8, n = 3.5, m = 1, θg = 45°

| 0 | 0 | 0 | 0 | 0 |
|---|---|---|---|---|
| 0 | 37 | 1 | 0 | 0 |
| 0 | 1 | 177 | 1 | 0 |
| 0 | 0 | 1 | 37 | 0 |
| 0 | 0 | 0 | 0 | 0 |

/255

σ = 0.9, n = 1, m = 1, θg = 45°

| 0 | 2 | 4 | 2 | 0 |
|---|---|---|---|---|
| 2 | 15 | 27 | 15 | 2 |
| 4 | 27 | 51 | 27 | 4 |
| 2 | 15 | 27 | 15 | 2 |
| 0 | 2 | 4 | 2 | 0 |

/251

σ = 0.9, n = 4, m = 1.25, θg = 45°

| 0 | 0 | 0 | 0 | 0 |
|---|---|---|---|---|
| 0 | 28 | 1 | 0 | 0 |
| 0 | 1 | 195 | 1 | 0 |
| 0 | 0 | 1 | 28 | 0 |
| 0 | 0 | 0 | 0 | 0 |

/255

σ = 1.0, n = 1, m = 1, θg = 45°

| 1 | 3 | 6 | 3 | 1 |
|---|---|---|---|---|
| 3 | 15 | 25 | 15 | 3 |
| 6 | 25 | 41 | 25 | 6 |
| 3 | 15 | 25 | 15 | 3 |
| 1 | 3 | 6 | 3 | 1 |

/253

σ = 1.0, n = 4.5, m = 1.5, θg = 45°

| 0 | 0 | 0 | 0 | 0 |
|---|---|---|---|---|
| 0 | 22 | 1 | 0 | 0 |
| 0 | 1 | 209 | 1 | 0 |
| 0 | 0 | 1 | 22 | 0 |
| 0 | 0 | 0 | 0 | 0 |

/257

IMAGE PROCESSING APPARATUS AND RECORDING MEDIUM, AND IMAGE PROCESSING APPARATUS

This is a continuation of Application No. PCT/JP01/05915 with an international filing date of Jul. 6, 2001, which was published under PCT Article 21(2) in Japanese, and the complete disclosure of which is incorporated into this application by reference.

BACKGROUND OF THE INVENTION

The present invention relates to an image processing method, a recording medium, and an image processing apparatus for smoothing digital data for an input image and for removing noise.

For an image input device such as a digital still camera (hereinafter referred to as digital cameras) or a scanner that use image input unit, including a CCD, the image input unit sometimes outputs not only an electric signal corresponding to the intensity of the light received, but also an unwanted electric signal. This unwanted electrical signal is included as noise in the digital data constituting an image. The occurrence of this noise tends to be especially remarkable in a low intensity luminous portion, i.e., a dark image portion.

Generally, in order to remove such noise included in an image, such a method is employed that smoothes all the digital data constituting an image, or a method is employed that uses edge information to remove the included noise.

For the removal of noise while maintaining the edge information, a method (a) for smoothing image data or for emphasizing contours in accordance with the slopes of the edges of an image; and a method (b) for detecting the direction of edges and changing smoothing ranges are presently available. Herein the slopes of the edges are the slopes of the luminance of the pixels that constitute an image.

However, according to the method (a) for smoothing the image data or for emphasizing the contours in accordance with the slopes of the edges, noise present in a flat portion wherein the amount of noise is comparatively less is also emphasized, and the image quality is deteriorated. On the other hand, according to the method (b) for detecting the direction of an edge so as to change a smoothing range, conditional branching is employed to detect the direction of the edge. Therefore, when angles used for detecting the direction of the edge are set in detail in order to increase the accuracy of the detection angles, the number of conditions imposed for the performance of the branching is increased. Therefore, it is difficult to perform fast processing such as pipeline processing. In addition, when the angles for the detection of the direction of an edge are roughly set in order to increase the processing speed, errors occur more frequently during the determination processing performed for conditional branching, and the edge tends to be blurred.

Further, the methods (a) and (b) are performed as independent functions, and there is no method for jointly implementing the functions of the two methods.

SUMMARY OF THE INVENTION

It is, therefore, one objective of the present invention to provide an image processing method and a recording medium therefor, and an image processing apparatus for quickly removing noise without blurring the edges of images or emphasizing the noise present in flat portions.

(1) An image processing method for smoothing digital data for an input image and for removing noise included in the digital data, the method comprising:
an edge information calculation step of extracting an edge of the image from the digital data, and calculating edge information including a grade and a direction of a slope of the edge;
a filter information selection step of selecting filter information that is set in advance based on the edge information obtained at the edge information calculation step; and
a processing step of smoothing the digital data based on the filter information selected at the filter information selection step.

(2) The image processing method according to (1), wherein, at the filter information selection step, when the grade of the slope is small, filter information is selected whose smoothing range describes a circular shape, and when the grade of the slope is large, filter information is selected whose smoothing range describes an elliptical shape.

(3) The image processing method according to (1), wherein, at the filter information selection step, filter information is selected for which the direction of the slope corresponds to the inclination of the smoothing range.

(4) The image processing method according to (1) further comprising:
a smoothing strength calculation step of calculating luminance using the digital data, and calculating a smoothing strength using the luminance,
wherein, at the filter information selection step, filter information is selected that corresponds to the edge information obtained at the edge information calculation step and the smoothing strength obtained at the smoothing strength calculation step.

(5) An image processing method, for smoothing digital data for an input image and removing noise included in the digital data, the method comprising:
an edge information calculation step of extracting an edge of the image from the digital data, and calculating edge information that includes a grade and a direction of a slope of the edge;
a filter information generation step of generating filter information based on the edge information obtained at the edge information calculation step; and
a processing step of smoothing the digital data based on the filter information generated at the filter information generation step.

(6) A recording medium storing a computer program for causing an image processing apparatus, which includes an input unit for entering image data, a processor for processing digital data output by the input unit and a recording unit for recording filter information used to process the digital data, to smooth digital data for an input image and to remove noise included in the digital data, the image processing apparatus being caused by the computer program to perform:
an edge information calculation step of extracting an edge of the image from the digital data received from the input unit, and calculating edge information including a grade and a direction of a slope of the edge;
a filter information reading step of reading out specific filter information stored in the recording unit based on the edge information obtained at the edge information calculation step; and
a processing step of smoothing the digital data based on the filter information read at the filter information reading step.

(7) The recording medium according to (6), wherein the filter information read at the filter information reading step is so set that when the grade of the slope is small, a smoothing range describes a circular shape, and when the grade of the slope is large, the smoothing range describes an elliptical shape.

(8) The recording medium according to (6), wherein filter information read at the filter information reading step is so set that a inclination of the smoothing range corresponds to the direction of the slope.

(9) The recording medium according to (6), wherein the image processing apparatus is caused by the computer program to further perform:

a smoothing strength calculation step of calculating luminance using the digital data, and of calculating a smoothing strength using the luminance, wherein, at the filter information reading step, specific filter information is read out from the recording unit based on the edge information obtained at the edge information calculation step and the smoothing strength obtained at the smoothing strength calculation step.

(10) A recording medium storing a computer program for causing an image processing apparatus, which includes an input unit for entering image data and a processor for processing digital data output by the input unit, to smooth digital data for an input image and to remove noise included in the digital data, the image processing apparatus being caused by the computer program to perform:

an edge information calculation step of extracting an edge of the image from the digital data, and calculating edge information that includes the grade and the direction of a slope of the edge;

a filter information generation step of generating filter information based on the edge information obtained at the edge information calculation step; and a processing step of smoothing the digital data based on the filter information generated at the filter information generation step.

(11) An image processing apparatus comprising:

an image input unit for receiving image data and outputting the image data as digital data;

an edge calculation unit for extracting an edge of an image from the digital data output by the image input unit, and for calculating edge information that includes the grade and the direction of a slope of the edge;

a recording unit for storing filter information that is set in correlation with the edge information;

a filter information selection unit for, based on the edge information calculated by the edge information calculation unit, selecting filter information stored in the recording unit; and a smoothing unit for smoothing the digital data based on the filter information selected by the filter information selection unit.

(12) An image processing apparatus according to (11), further comprising:

a smoothing strength calculation unit for calculating luminance using the digital data, and calculating a smoothing strength using the luminance, wherein, on the recording unit, filter information is stored that is set in correlation with the edge information obtained by the edge information calculation unit and the smoothing strength obtained by the smoothing strength calculation unit.

(13) An image processing apparatus comprising:

an image input unit for receiving image data and outputting the image data as digital data;

an edge calculation unit for extracting an edge of an image from the digital data output by the image input unit, and calculating edge information that includes the grade and the direction of a slope of the edge;

a filter information generation unit for generating filter information stored in the recording unit based on the edge information calculated by the edge information calculation unit;

a smoothing unit for smoothing the digital data based on the filter information generated by the filter information generation unit; and a recording unit for storing the smoothed digital data.

According to (1), (6) or (11), digital data is smoothed using filter information corresponding to an edge. Further, since the filter information is set in advance and is selected based on the edge information that is obtained, a complicated conditional branching process need not be performed, and pipeline processing can be used to perform the smoothing process quickly. Therefore, the noise removal process can be performed rapidly without blurring the edges of images or emphasizing the noise present in flat portions.

According to (2) or (7), the filter information is so set that as the slope of an edge is increased, the range for smoothing the filter information is changed from a circle to an ellipse. Therefore, when the slope of an edge is steep, i.e., there is a great change in the luminance, the range for smoothing the filter information is changed to an elliptical shape, and the smoothing can be performed along the edge. Therefore, without emphasizing the noise present in a flat portion, along an edge, only the noise near the edge is removed.

According to (3) or (8), the filter information is so set that the direction of a slope matches the inclination of the smoothing range. Thus, even when the shape of the edge is changed, the smoothing range can be changed in accordance with the shape of the edge.

According to (4), (9) or (12), luminance is calculated based on the digital data, and the smoothing intensity is calculated using the luminance. The filter information is selected based on the smoothing intensity and the edge information. Thus, the smoothing intensity can be changed using the luminance of the edge, and noise near the edge can be extensively removed. As a result, the noise near the edges can be removed without emphasizing the noise present in the flat portions.

According to (5), (10) or (13), digital data is smoothed by using a filter that corresponds to an edge. The filter information is created based on the obtained edge information that is obtained. Therefore, complicated conditional branching processing need not be performed, and pipeline processing can be used to perform the smoothing processing quickly. Further, the filter information to be smoothed is changed in accordance with an image. And therefore, noise can be thoroughly removed in accordance with an image, without the edges of the image becoming blurred and noise present in flat portions being emphasized.

BRIEF DESCRIPTION OF THE DRAWINGS

FIG. 9 is a diagram showing a matrix depicting the filter information on the periphery of the target pixel according to the first image processing method of the embodiment of the present invention, and is used for explaining the relationship between a smoothing intensity and a smoothing range employed for changing a scaling parameter;

DETAILED DESCRIPTION OF PREFERRED EMBODIMENTS

A plurality of embodiments according to the present invention will now be described based on the drawings.

First Embodiment

Figure 2:
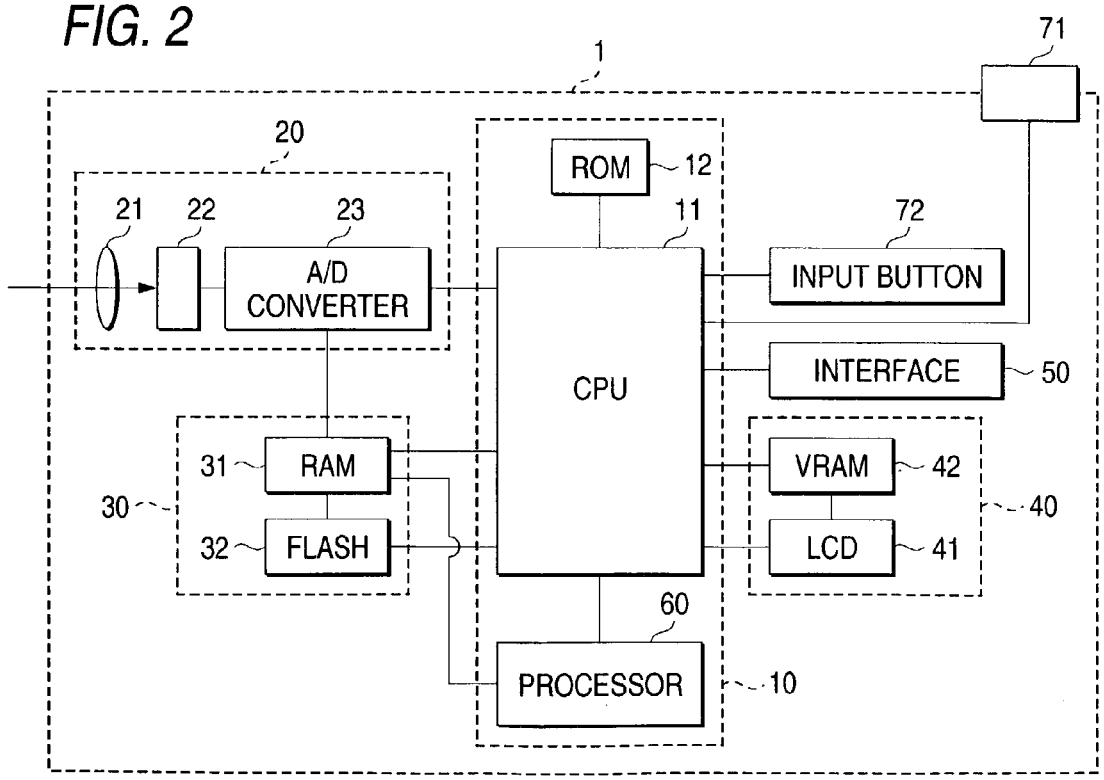
FIG. 2 is a block diagram showing a digital camera according to the first embodiment of the present invention.

FIG. 2 is a diagram showing a digital camera 1 for which an image processing apparatus according to a first embodiment of the present invention is applied.

As is shown in FIG. 2, the digital camera 1 comprises: a controller 10, an image input unit 20, a recording unit 30, a display unit 40 and an interface 50.

The controller 10 is an electric circuit for processing digital data output by the image input unit 20. The controller 10 includes a CPU (Central Processing Unit) 11, a ROM (Read Only Memory) 12 and a processor 60. In the ROM 12, a computer program is recorded that is executed by the CPU 11 and the processor 60 of the controller 10.

Figure 3:
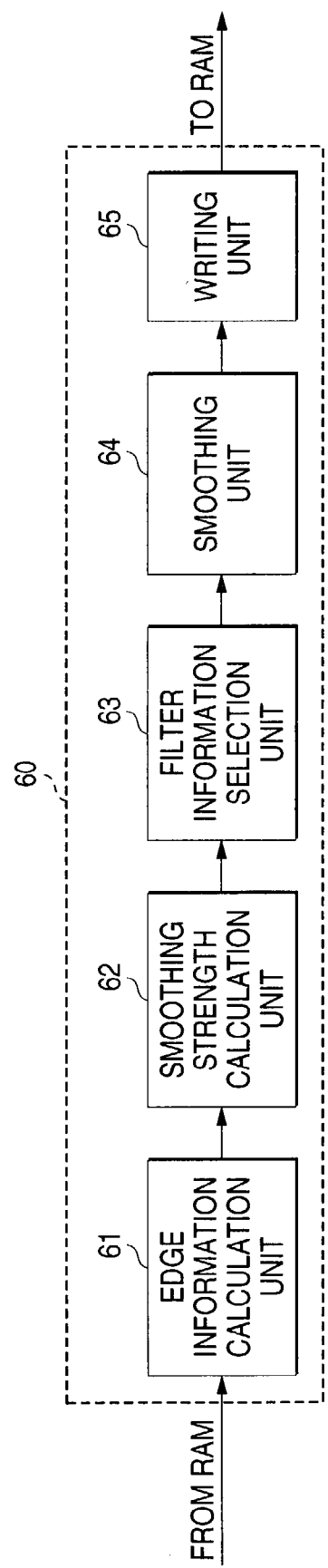
FIG. 3 is a block diagram showing the processing performed by the digital camera according to the embodiment of the present invention.

As is shown in FIG. 3, the processor 60 includes an edge information calculation unit 61, a filter information selection unit 63, a smoothing unit 64 and a writing unit 65.

As is shown in FIG. 2, an input unit for receiving an entry from a user is connected to the controller 10. The input unit includes a shutter button 71 for receiving an imaging instruction from the user, and a plurality of input buttons 72 for receiving instructions for the performance of various functions of the digital camera 1.

The image input unit 20 includes a condensing lens 21, a CCD 22 and an A/D converter 23. The condensing lens 21 collects light from an object that is then transmitted to the CCD 22. The CCD 22 includes a plurality of imaging elements. These imaging elements are arranged horizontally and vertically in the shape of a matrix, and each imaging element constitutes one pixel.

Figure 4:
FIG. 4 is a specific diagram showing the CCD of the digital camera according to the first embodiment of the present invention.

Color filters are arranged on the light receiving face of the imaging element. The color filters are complementary Cy (Cyan), Mg (Magenta), Ye (Yellow) and G (Green) filters. The complementary filters on the CCD 22 are arranged as shown in FIG. 4. Of the primary three light colors, i.e., red (R), green (G) and blue (B), the color filters pass light having the following colors: Cy=G+B, Mg=B+r, and Ye=G+R. That is, one filter passes light for two colors.

The light entering the individual imaging elements of the CCD 22 is converted into an electric signal, and the electric signal is then output. Since the electric signal output by the CCD 22 is an analog signal, the A/D converter 23 converts the analog signal into digital data.

The recording unit 30 includes a RAM (Random Access Memory) 31 and a flash memory 32. A DRAM (Dynamic RAM) having a self-refresh function is used as the RAM 31. The flash memory 32 is a writable recording medium on which stored contents can be retained even in the non-active state, and is either incorporated into the digital camera 1, or is detachable from the digital camera 1.

The RAM 31 is used to temporarily store the digital data processed by the controller 10 or output from the A/D converter 23. The flash memory 32 is used to accumulate and store the digital data that is temporarily stored in the RAM 31. Further, filter information, which will be described later, is stored in the flash memory 32.

The display unit 40 includes a liquid crystal display device (LCD) 41 and a VRAM (Video RAM) 42. The LCD 41 is used to display an image based on digital data stored in the flash memory 32 or output by the A/D converter 23. The VRAM 42 is used to store display data that is created from the digital data in order to display an image on the LCD 41.

An interface 50 outputs digital data stored in the flash memory 32 to an external apparatus, such as a personal computer.

The detailed processing performed by the controller 10 will now be described.

As previously described, a processor 60 that is provided for the controller 10 is a dedicated arithmetic unit for performing image processing. The processor 60 performs predetermined processing using a computer program stored in the ROM 32.

Figure 1:
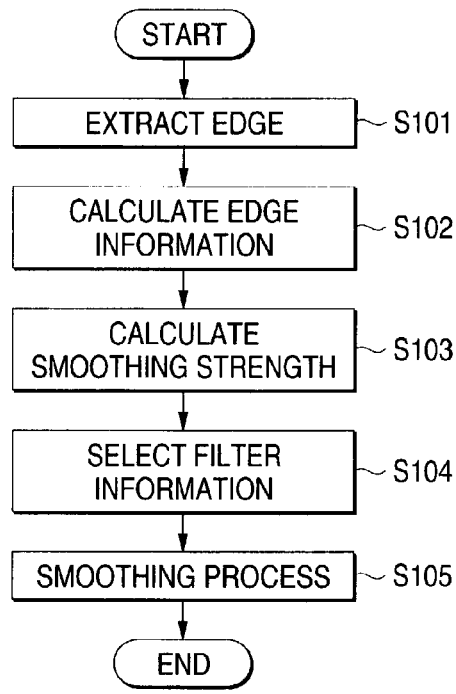
FIG. 1 is a flowchart showing an image processing method according to a first embodiment of the present invention.

The processing performed by means of the processor 60 will be described by referring to FIGS. 1 and 3. The pipeline processing is employed by means of the processor 60 without the CPU 11 using used.

Edge Information Calculation Unit

The edge information calculation unit 61 performs edge extraction processing for the digital data for an image output by the image input unit (S101). An extracted edge is employed for calculations performed to determine the slope and the direction of the edge.

For the extraction of the edge, a Prewitt operator is employed for obtaining the differential value of a pixel. The Prewitt operator is represented by the following equations.

Figure 5:
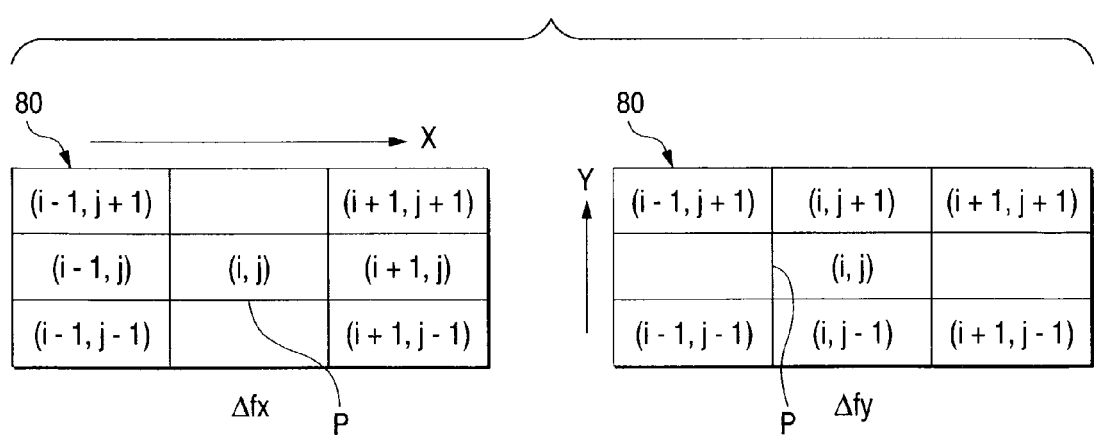
FIG. 5 is a specific diagram for explaining the edge extraction process performed by the image processing method according to the first embodiment of the present invention.

When the target pixel is defined as P(i, j), as is shown in FIG. 5, $$\Delta f_x = \{P(i+1, j-1) - P(i-1, j-1)\} + \{P(i+1, j) - P(i-1, j)\} + \{P(i+1, j+1) - P(i-1, j+1)\}$$

$$\Delta f_y = \{P(i-1, j+1) - P(i-1, j-1)\} + \{P(i, j+1) - P(i, j-1)\} + \{P(i+1, j+1) - P(i+1, j-1)\}$$

In these equations, edge extraction is performed based on the digital data that is output from pixels neighboring the target pixel which constitute a matrix 80 (3×3 matrix around the target pixel P in this embodiment) and include the target pixel P in the center as shown in FIG. 5 and include the target pixel P in the center. During the edge extraction process, the edge elements in the directions X and Y, indicated by arrows, are detected. When the output is 8 bits, 256 tone data levels, 0 through 255, are output by the pixels as digital data.

Next, edge information, including the slope and the direction of the edge, is calculated using the edge extracted by the equations (S102). The grade grad of the slope of the edge is calculated using the following equation (A), and the direction θg of the slope of the edge is calculated using the following equation (B).

$$G(\phi) = \sqrt{\Delta f_x^2 + \Delta f_y^2} \quad (A)$$

$$\Theta_g = \tan^{-1}\left(\frac{\Delta f_y}{\Delta f_x}\right) \quad (B)$$

Using the equations (A) and (B), the edge information calculation unit 61 calculates, as edge information, the grade grad and the direction θg of the slope of the edge.

Further, instead of equation (A), equation (A1) or (A2) may be employed to calculate the grade grad of the slope of the edge. When the equation (A1) or (A2) is employed, the grade grad of the slope of the edge can be quickly obtained.

$$\text{grad}(\phi) = |\Delta f_x| + |\Delta f_y| \quad (A1)$$

$$\text{grad}(\phi) = \max(\Delta f_x, \Delta f_y) \quad (A2)$$

Figure 6:
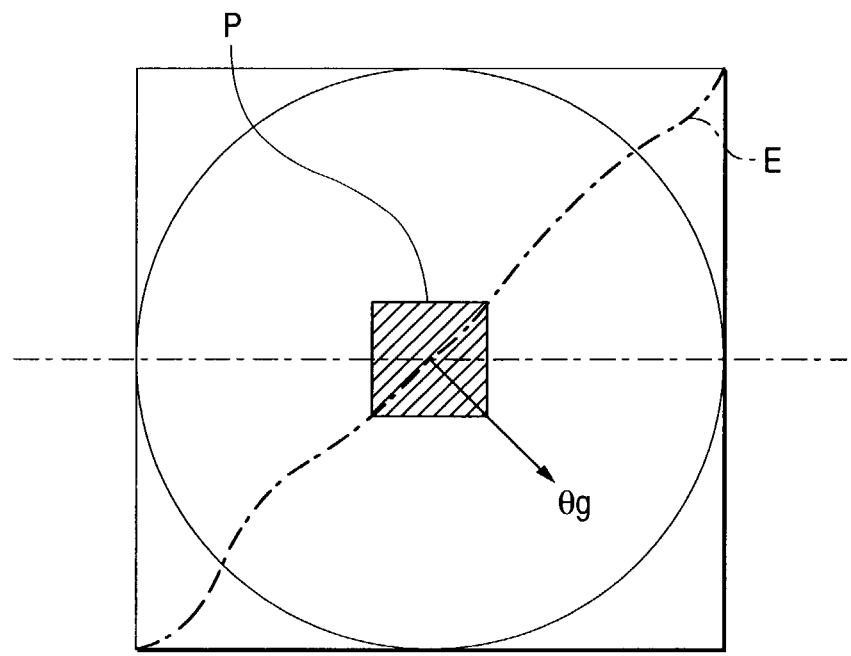
FIG. 6 is a diagram for explaining the relationship between the edge of a target pixel and the direction of the slope of the edge, for the image processing method according to the first embodiment of the present invention.

The edge is a portion whereat the tone of the digital data output by the pixel is greatly changed, i.e., the boundary portion between the objects included in the image. In this embodiment, the tone of the digital data output by the pixel is greatly changed on both sides of the edge. The change in the tone of the digital data is defined as the grade grad of the slope, and the direction in which the tone of the digital data is changed is defined as the direction θg of the slope. Therefore, as is shown in FIG. 6, the direction of the edge E is perpendicular to the direction θg of the slope of the edge.

Smoothing Strength Calculation Unit

Not only the edge information, but also the smoothing strength is calculated using the digital data output by the image input unit 20 (S103).

The smoothing strength calculation unit 62 calculates smoothing strength σ based on the information for luminance Y included in the digital data that is output by each pixel of the CCD 22. The smoothing strength σ is obtained by solving the following equation (C):

$$\sigma = N(Y) = \left(\frac{eY}{n}\right)^2 \exp\left(-\frac{2Y}{n}\right) \quad (C)$$

In (C), e denotes a natural logarithmic number, and n denotes a luminance at which the noise reaches the maximum. The luminance n is changed in accordance with the imaging condition, and in this embodiment, n=50 when the output by the pixel is 8 bits, 256 tones.

The smoothing range is calculated using the smoothing strength σ obtained by (C). The Gaussian distribution, which will be described later, is employed to obtain the smoothing range.

Filter Information Selection Unit

Based on the edge information obtained by the edge information calculation unit 61 and the smoothing strength, the filter information selection unit 63 selects filter information stored in the flash memory 63. From among multiple sets of stored filter information, the filter information selection unit 63 selects the filter information that corresponds to the obtained edge information and the smoothing strength (S104).

The filter information is the one obtained by, based on the edge information, modifying a smoothing filter that is set using the Gaussian distribution. The principle will now be described by using an example. In this embodiment, a 5×5 matrix, including the target pixel P in the center, is defined as a smoothing range.

The Gaussian distribution is obtained by solving the following equation (D):

$$\delta(x, y) = \frac{1}{2\pi\sigma^2} \exp\left(\frac{n^2(x\cos\theta_g - y\sin\theta_g)^2 + m^2(x\sin\theta_g + y\cos\theta_g)^2}{-2\sigma^2}\right).$$

Equation (D) represents a Gaussian distribution that is modified to describe an ellipse by scaling the short axial direction using 1/n and the long axial direction using 1/m, and is rotated to the right in a direction θg. That is, the elliptical shape is changed by m and n and the inclination of the ellipse is changed by θg. The m and n values are scaling parameters and depend on the grade grad of the slope obtained by equation (A).

Figure 7:
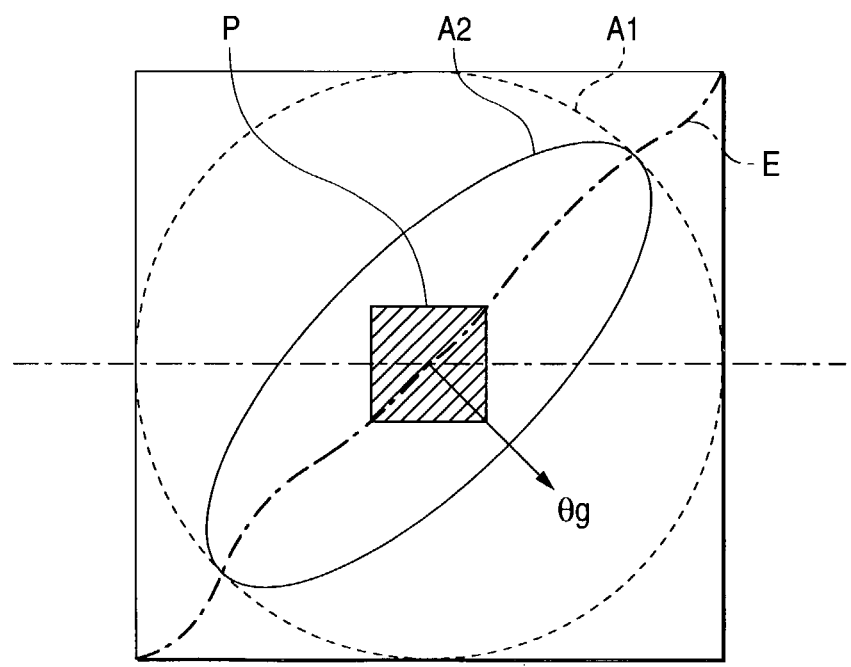
FIG. 7 is a diagram for explaining the range for the smoothing of a target pixel for the image processing method according to the first embodiment of the present invention.

As the grade grad of the slope of the edge is increased, the values of the scaling parameters m and n (mainly the value of n) are increased, and the Gaussian distribution shape is changed and describes a flat elliptical shape. Further, as the ellipse is rotated in accordance with the slope direction θg, the smoothing range A along the edge E is obtained, as is shown in FIG. 7. That is, when the values of the scaling parameters m and n are small, the smoothing range A1 describes a circle, as indicated by the broken line in FIG. 7. On the other hand, as the scaling parameters m and n, especially the value of n, are increased, the smoothing range A2 assumes a flat elliptical shape, as is indicated by the solid line in FIG. 7.

As a result of the calculation of the edge information for the target pixel P, it is found that the periphery of the target pixel P is a flat portion when the slope of the edge is small. Therefore, the digital data output by the target pixel P must be equally distributed throughout the peripheral pixels of the target pixel P. Thus, the smoothing range is shaped like a circle that includes the target pixel P in the center.

When the slope of the edge is large, the periphery of the target pixel P is an edge portion. Therefore, the digital data output by the target pixel P must be distributed throughout the peripheral pixels of the target pixel P along the edge. Thus, the smoothing range is shaped like an ellipse along the edge E along the target pixel P in the center. That is, as the slope of the edge is increased, the smoothing process must be performed along the edge E.

In this embodiment, the grade grad of the slope of the edge obtained by the edge information calculation unit 61 is correlated with the values of the scaling parameters m and n. Thus, when the grade grad of the slope is determined, scaling parameters m and n are determined that correspond to the grade grad of the slope.

Figure 8:
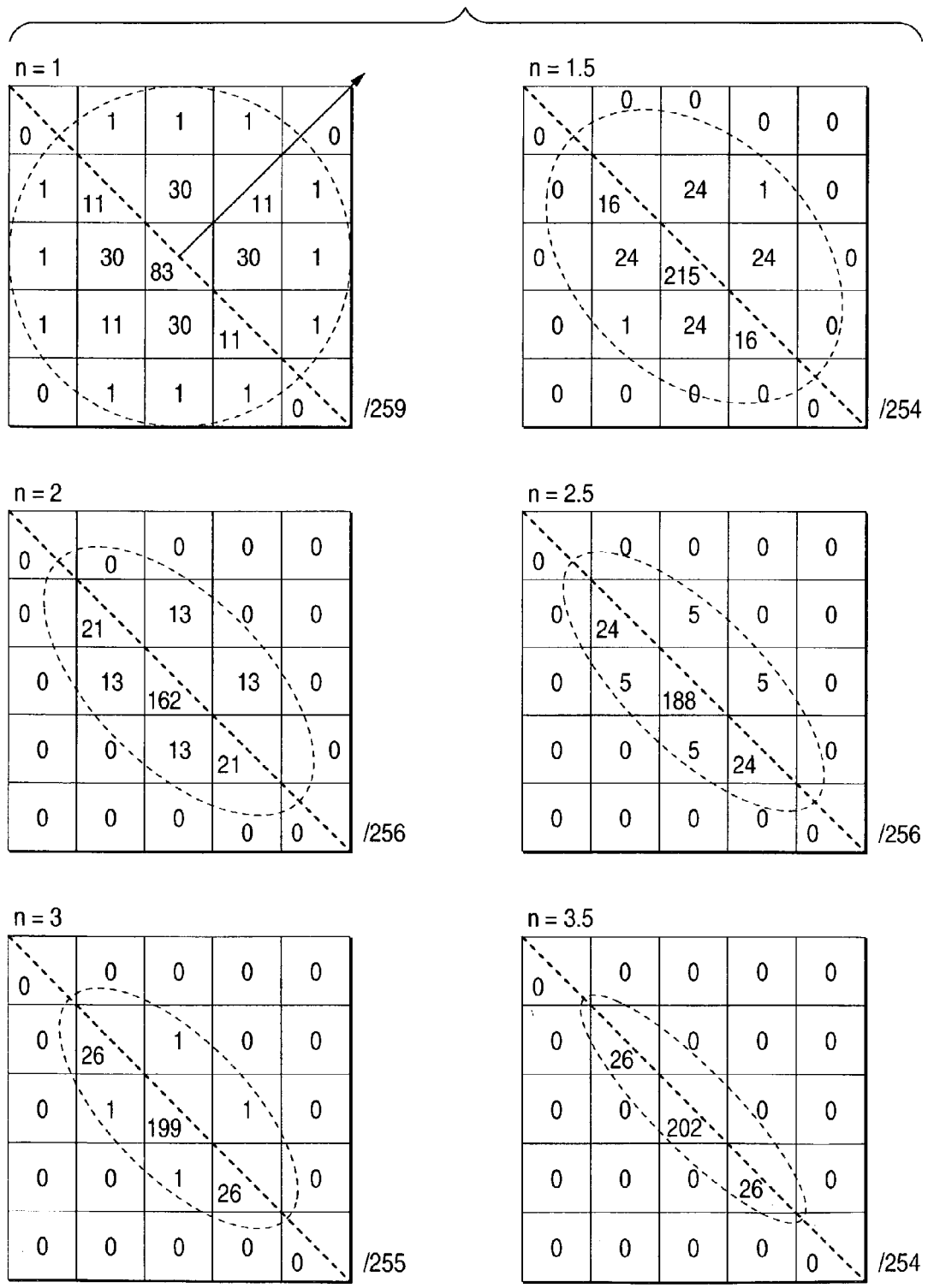
FIG. 8 is a specific diagram showing a matrix depicting the filter information on the periphery of a target pixel according to the image processing method of the first embodiment of the present invention, and is used for explaining the relationship between a scaling parameter and a smoothing range.

FIG. 8 is a diagram showing the change in the smoothing range when the scaling parameter n is changed while the direction $\theta g=45°$ of the slope and the smoothing strength $\sigma=0.7$ are maintained as an example. The matrix is not limited to the 5×5 dimension used in this embodiment, and can be an appropriately set dimension, such as 3×3 or 7×7.

It is apparent from FIG. 8 that when n=1 the smoothing range is uniform in all directions, and that as the value of n is increased, the axis along the direction $\theta g$ of the slope is shortened and the smoothing range is concentrated along the edge E. Further, when the scaling parameter n is greater than n=3, the smoothing range is substantially unchanged. Therefore, when $\sigma=0.7$, the effective range of the scaling parameter n is from 1 to 3.

An explanation will now be given for the relationship between the smoothing strength and the scaling parameter. The smoothing range can be changed in accordance with the level of the smoothing strength $\sigma$ using the equation (D) When the smoothing strength $\sigma$ is small, the smoothing effect is small, and when the smoothing strength $\sigma$ is large, the smoothing effect is great.

Since the smoothing range is increased as the smoothing strength $\sigma$ becomes greater, the smoothing range must be reduced by increasing the scaling parameter n. Further, since the effects of smoothing the edge become too great if only the scaling parameter n in the shorter axial direction is changed, the scaling parameter m in the longer axial direction must also be changed.

FIG. 9 is a diagram showing filter information that provides the minimum smoothing effect and filter information that provides the maximum smoothing effect, which are obtained in case of changing the smoothing strength $\sigma$. The left column in FIG. 9 represents the filter information that provides the minimum smoothing effect, and the right column represents the filter information that provides the maximum smoothing effect.

Multiple filter information sets that correspond to the individual parameters are stored in the flash memory 32. These filter information sets include a smoothing range that is set by combining the scaling parameters m and n and the direction $\theta g$ of the slope, which are determined by the grade grad of the slope, and the smoothing strength $\sigma$ that is calculated using the luminance Y.

The filter information selection unit 63 reads out specific filter information from multiple filter information sets that are stored in the flash memory 32. That is, the values of the scaling parameters m and n are determined from the grade grad of the slope of the edge that is calculated by the edge information calculation unit 61. Then, based on the scaling parameters m and n that are thus determined, the direction $\theta g$ of the slope, and the smoothing strength $\sigma$ obtained by the smoothing strength calculation unit 62, the specific filter information is selected and is read out from the flash memory 32.

Smoothing Unit

When the filter information is selected by the filter information selection unit 63, the smoothing process is performed by using the digital data output by the target pixel P and the selected filter information (S105). The smoothing process is performed by multiplying the row data of the digital data output by the target pixel P by the numerical value of the filter information.

Figure 10:
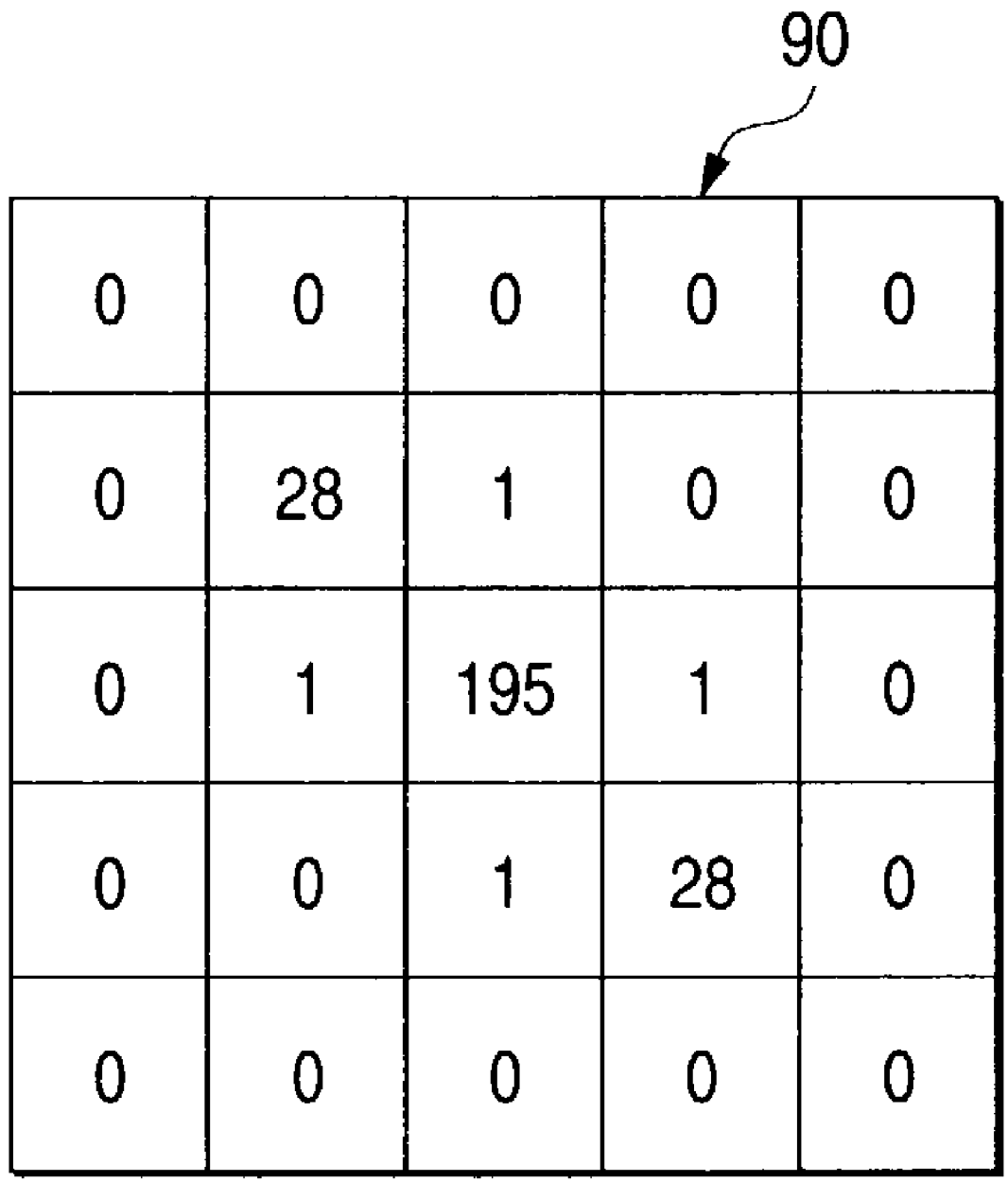
FIG. 10 is a specific diagram showing filter information when, for the image processing method according to the first embodiment, the smoothing intensity σ=0.9, the scaling parameter n=4, m=1.25 and the slope direction θg=45°.

Assume that the scaling parameters m=1.25 and n=4 are determined from the grade grad of the slope obtained by the peripheral matrix 80 of the target pixel P, the inclination of the slope is $\theta g=45°$, and the smoothing strength $\sigma=0.9$ is obtained based on the luminance Y of the target pixel P. Then, filter information 90 shown in FIG. 10 is selected by the filter information selection unit 63. When the row data of the digital data output by the target pixel P is multiplied by the numerical value (the numerical value of a matrix/the sum) of the filter information in FIG. 8, the information for the target pixel P is distributed among specific pixels of the 5×5 matrix 80, including the target pixel P in the center. Since the information for the target pixel P is distributed among the specific pixels of the matrix 80, the smoothing process is performed for the digital data for the target pixel P.

This smoothing process is performed for all the pixels that constitute the image, i.e., all the pixels in the CCD 22. Since the smoothing process is performed for the 24 peripheral pixels of one pixel, the smoothing process is repeated 25 times for one pixel. The total of the data obtained by the smoothing process performed for the peripheral pixels becomes the digital data obtained by the smoothing.

Writing Unit

When the smoothing process is completed by the smoothing unit 64, the obtained digital data is written to the RAM 31 by the writing unit 65.

When the digital data for one image is written to the RAM 31 by the writing unit 65, the digital data stored in the RAM 31 is compressed in order to reduce the amount of data that is to be stored in the flash memory 32. When data for an image obtained by the digital camera 1 is to be compressed, a file form, such as JPEG (Joint Photographic Experts Group) or TIFF (Tagged Image File Format), is employed. The compressed digital data is recorded in the flash memory 32.

Operation of Digital Camera

The operation performed by the digital camera 1 according to the first embodiment will now be described.

(1) When the power switch (not shown) of the digital camera 1 is turned on, the digital camera 1 is set to the standby state so that the image pickup is always ready. At this time, the CCD 22 converts into an electric signal light that is condensed by the condenser 21 every tenth to several hundredths of a second. The obtained electric signal is then converted to digital data by the A/D converter 23. When a user employs the LCD 41 as a viewfinder, the digital data output by the A/D converter is transmitted to the VRAM 42, and the object is displayed on the LCD 41 as an animated picture.

(2) When the user depresses the shutter button 71 to the middle of the operating range and the shutter button 71 is set to the "half-depressed" state, the exposure and focus are set and fixed. The exposure fixed during the imaging can be changed when the CPU 11 of the controller 10 controls the aperture of the condensing lens 21 or the shutter speed, i.e., the charge accumulation period for the CCD 22. One of or both of a mechanical shutter for physically shielding light and a digital shutter for controlling the charge accumulation time for the CCD 22 are employed as the shutter of the digital camera 1.

(3) When the shutter button 71 is set to the "fully depressed state" in which the user depresses the button 71 to the limit of the operating range, the following process is performed. First, light measurement and focusing are precisely performed for the object. When the light measurement and the focusing have been completed, all the charges accumulated in the CCD 22 are temporarily discharged, and light from the object passes through the condenser 21 and enters the CCD 22. The CCD 22 then outputs an electric signal based on the strength of charges that correspond to the amount of incident light.

(4) The electric signal output by the CCD 22 is then converted into digital data by the A/D converter 23. And in order to increase the processing speed, DMA (Direct Memory Access) is employed to directly, temporarily store the digital data at a designated address in the RAM 31 without the data passing through the CPU 11 of the controller 10.

(5) The processor 60 performs the above processing for the digital data stored in the RAM 31, and regards the resultant data as digital data for an appropriate color image. In order to increase the number of images recorded in the flash memory 32, the obtained data is compressed to obtain digital data having a JPEG file form.

(6) After the digital data has been compressed, the digital data is copied from the RAM 31 to the flash memory 32 and is recorded therein.

As is described above, according to the image processing method performed by the digital camera 1 according to the first embodiment of the present invention, filter information is selected and read based on the scaling parameters n and m, which are determined by the grade grad of the slope of the edge that passes through the target pixel P, the direction θg of the slope of the edge, and the smoothing strength σ calculated using the digital data output by the target pixel P. Therefore, appropriate filter information corresponding to the edge can be selected without complicated conditional branching being required. In addition, the filter information is designated and stored in the flash memory 32, i.e., filter information appropriate for processing digital data output by the target pixel P is selected based on the obtained edge information and the smoothing strength σ. Therefore, the smoothing can be performed quickly using pipeline processing.

Thus, noise can be removed quickly, without the edge of an image being blurred or the noise present in a flat portion being emphasized.

Furthermore, the information for the smoothing range included in the filter information is so set that as the grade grad of the slope of the edge is increased, the smoothing range is changed from a circular into an elliptical shape. Thus, noise near the edge can be thoroughly removed without emphasizing noise present in the flat portion.

Further, when the filter information is selected using the edge information and the smoothing strength, a function for smoothing the data in accordance with the slope of the edge and for emphasizing the contour and a function for changing the smoothing range can be performed at the same time. Thus, a fast noise removal process can be performed.

Second Embodiment

A processor 100 for a digital camera according to a second embodiment of the present invention will now be described while referring to FIGS. 10 and 11. No explanation will be given for components and processing that are substantially the same as those in the first embodiment.

The second embodiment differs from the first embodiment in that filter information is generated each time the grade grad of the slope of the edge and the direction θg of the slope, both of which constitute the edge information.

Figure 11:
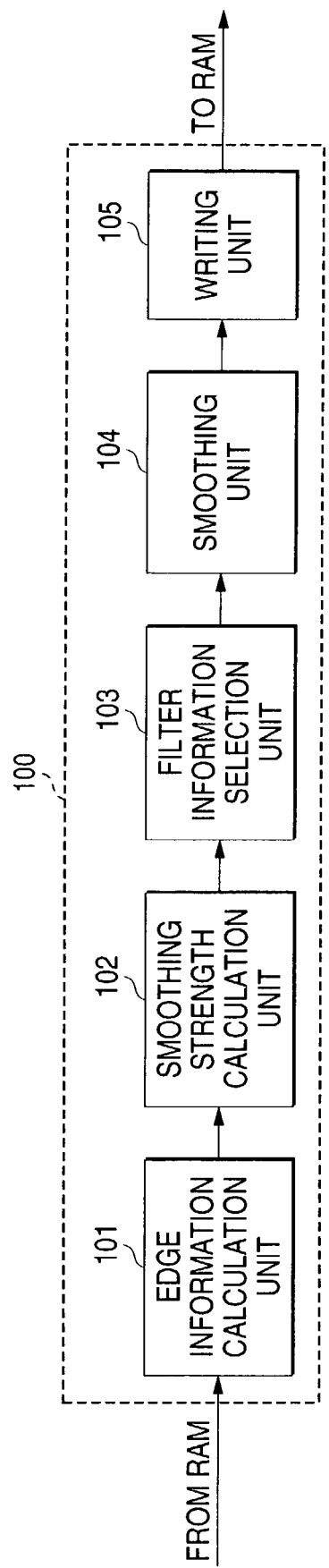
FIG. 11 is a diagram showing the processor of a digital camera according to a second embodiment of the present invention.
Figure 12:
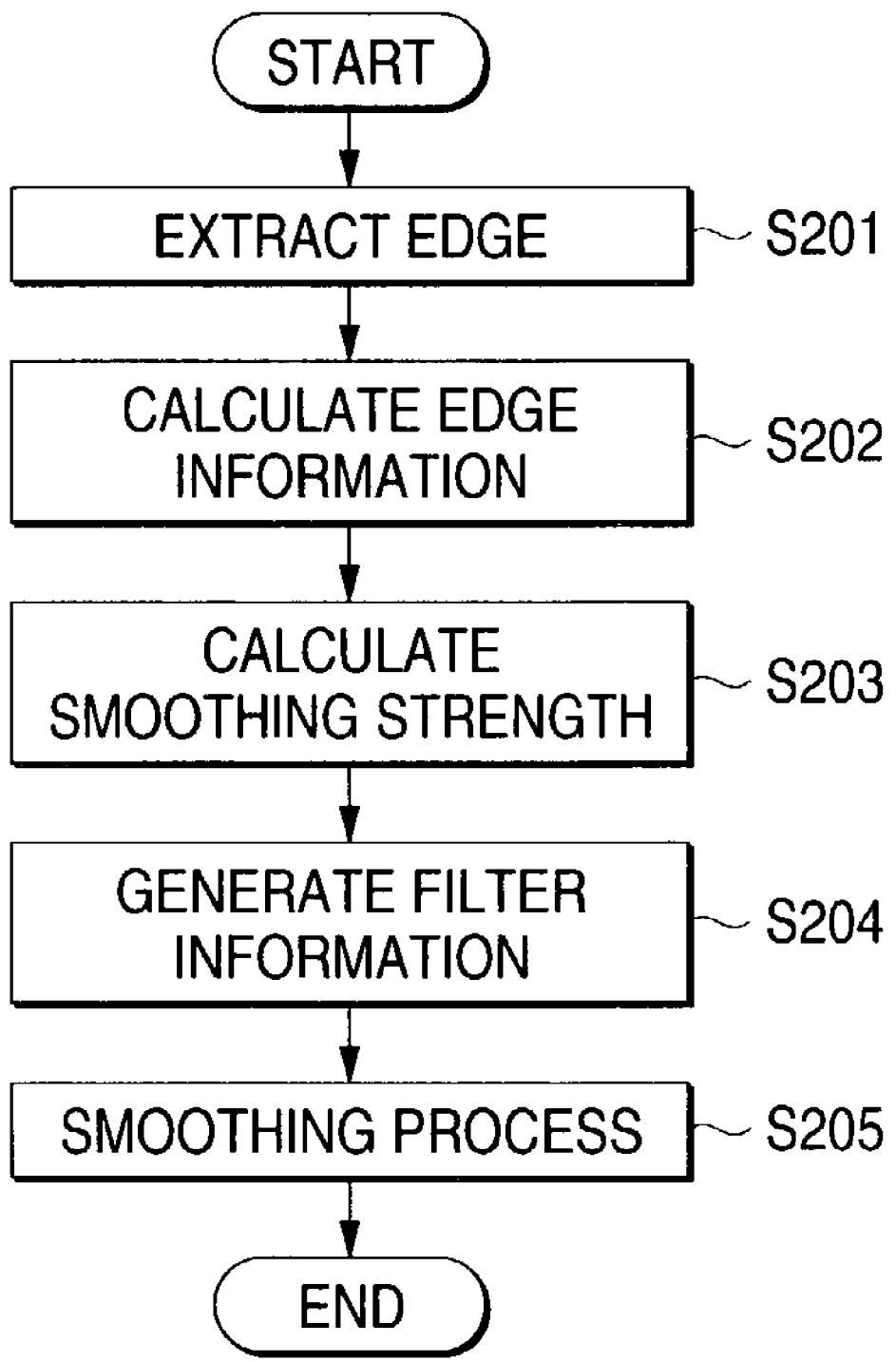
FIG. 12 is a flowchart showing the image processing method according to the second embodiment of the present invention.

As is shown in FIG. 11, the processor 100 for the digital camera in the second embodiment comprises: an edge information calculation unit 101, a smoothing strength calculation unit 102, a filter information generation unit 103, a smoothing unit 104 and writing unit 105.

The edge information calculation unit 101 and the smoothing strength calculation unit 102 are the same as those in the first embodiment. The filter information generation unit 103 generates filter information using equation (D), as explained in the first embodiment, based on the edge information obtained by the edge information calculation unit 101 and the smoothing strength obtained by the smoothing strength calculation unit 102. That is, each time the edge information and the smoothing strength are calculated based on the digital data output by the pixels that constitute an image, filter information is generated for the individual pixels.

In the second embodiment, the process (S201) for extracting an edge from the digital data output by the CCD 22, the process (S202) for calculating the edge information using the extracted edge and the process (S203) for calculating the smoothing strength are the same as those as in the first embodiment. In the second embodiment, the scaling parameters m and n are set based on the edge information and the smoothing strength obtained by the filter information generation unit 103. The filter information generation unit 103 generates filter information using equation (D) (S204). The smoothing unit 104 employs the filter information obtained by the filter information generation unit 103 to smooth the digital data output by the pixel (S205). And the smoothed digital data is stored by the writing unit 105 in the RAM 31 of the recording unit 30.

In the second embodiment, each time the edge information and the smoothing strength are calculated using the digital data output by the pixel, the scaling parameters m and n are designated, and filter information corresponding to each pixel is generated. Therefore, noise can be effectively removed without the edge being blurred.

In these embodiments of the invention, the luminance Y has been calculated after the edge information has been is obtained. However, the luminance Y may be calculated first, or the edge information and the luminance Y may be calculated in parallel, at the same time. Further, the smoothing range may be determined not only based on the luminance Y, but also based on the strength of the color element, such as RGB.

Furthermore, in the embodiments of the invention, the smoothing range is changed by altering the smoothing strength and the scaling parameters m and n. However, even when the smoothing strength φ is fixed, the smoothing range can be changed by changing the scaling parameters m and n. Therefore, when the value of the smoothing strength φ is fixed at a constant value, and the scaling parameters m and n are changed based on the grade and the direction of the slope of the edge, the filter information can more quickly be selected or generated.

Further, in the embodiments of the invention, the Prewitt operator is employed as a method for extracting the grade and the direction of the slope of the edge. However, another edge extraction method, such as the Sobel operator or the Kirsch operator, may be employed.

In addition, in the embodiments of the invention, a color image of 256 tones for which a complementary filter is used has been employed as an image to be input. However, a color image using the RGB primary color filter, a color image having 1024 or 4096 tones, a gray scale image or a binary monotone image may be employed as an input image.

Moreover, in the embodiments of the invention, an explanation is given for the processing of the digital data output by a CCD having a complementary filter. However, not only a complementary filter, but also a RGB primary filter can be employed.

In the embodiments of the invention, a digital camera is employed as an image processing apparatus. However, the present invention can be applied for image processing performed not only by a digital camera, but also by an image reading apparatus, such as a scanner or a copier, or for image processing for which software, such as a printer driver, is used.

What is claimed is:

1. An image processing method for smoothing digital data for an input image and for removing noise included in the digital data, the method comprising:
   extracting an edge of the image from the digital data,
   calculating edge information comprising a grade and a direction of a slope of the extracted edge;
   selecting preset filter information based on the calculated edge information; and
   smoothing all of the digital data based on the selected filter information.

2. The image processing method according to claim 1, wherein:
   the filter information comprises first filter information with a smoothing range described by a circle shape and second filter information with a smoothing range described by an elliptical shape;
   when the grade of the slope is smaller than a threshold, the first filter information is selected; and
   when the grade of the slope is larger than the threshold, the second filter information is selected.

3. The image processing method according to claim 1, wherein, the filter information is selected for which the direction of the slope corresponds to an inclination of a smoothing range.

4. The image processing method according to claim 1 further comprising:
   calculating luminance using the digital data;
   calculating a smoothing strength using the luminance; and
   selecting the filter information corresponding to the calculated edge information and the calculated smoothing strength.

5. An image processing method, for smoothing digital data for an input image and removing noise included in the digital data, the method comprising:
   extracting an edge of the image from the digital data;
   calculating edge information comprising a grade and a direction of a slope of the edge;
   generating filter information based on the calculated edge information; and
   smoothing all of the digital data of the input image based on the generated filter information.

6. A computer readable medium storing a computer program intended for use with an image processing apparatus which includes an input unit for entering image data, a processor for processing digital data output by the input unit, and a recording unit for recording filter information used to process the digital data, to smooth digital data for an input image and to remove noise included in the digital data, the computer program defining operations, comprising:
   an edge information calculation step of extracting an edge of the image from the digital data received from the input unit, and calculating edge information comprising a grade and a direction of a slope of the edge;
   a filter information reading step of selecting specific filter information stored in the recording unit based on the edge information obtained at the edge information calculation step; and
   a processing step of smoothing all of the digital data received from the input unit based on the filter information selected at the filter information reading step.

7. The computer readable medium according to claim 6, wherein the filter information selected at the filter information reading step is so set that when the grade of the slope is small, a smoothing range describes a circular shape, and when the grade of the slope is large, the smoothing range describes an elliptical shape.

8. The computer readable medium according to claim 6, wherein the filter information selected at the filter information reading step is so set that an inclination of a smoothing range corresponds to the direction of the slope.

9. The computer readable medium according to claim 6, wherein the operations further comprise:
   a smoothing strength calculation step of calculating luminance using the digital data, and of calculating a smoothing strength using the luminance,
   wherein, at the filter information reading step, specific filter information is selected from the recording unit based on the edge information obtained at the edge information calculation step and the smoothing strength obtained at the smoothing strength calculation step.

10. A computer readable medium storing a computer program intended for use with an image processing apparatus which includes an input unit for entering image data and a processor for processing digital data output by the input unit, to smooth digital data for an input image and to remove noise included in the digital data, the computer program defining operations, comprising:
    an edge information calculation step of extracting an edge of the image from the digital data, and calculating edge information that comprises a grade and a direction of a slope of the edge;
    a filter information generation step of generating filter information based on the edge information obtained at the edge information calculation step; and
    a processing step of smoothing all of the digital data received from the input unit based on the filter information generated at the filter information generation step.

11. An image processing apparatus comprising:
    an image input unit for receiving image data and outputting the image data as digital data;
    an edge calculation unit for extracting an edge of an image from the digital data output by the image input unit, and for calculating edge information that comprises a grade and a direction of a slope of the edge;
    a recording unit for storing filter information that is set in correlation with the edge information;

a filter information selection unit for, based on the edge information calculated by the edge information calculation unit, selecting filter information stored in the recording unit; and a smoothing unit for smoothing all of the digital data output by the image input unit based on the filter information selected by the filter information selection unit.

12. An image processing apparatus according to claim 11, further comprising:

a smoothing strength calculation unit for calculating luminance using the digital data, and calculating a smoothing strength using the luminance, wherein, on the recording unit, the filter information is stored that is set in correlation with the edge information obtained by the edge information calculation unit and the smoothing strength obtained by the smoothing strength calculation unit.

13. An image processing apparatus comprising:

an image input unit receiving image data and outputting the image data as digital data;

an edge calculation unit extracting an edge of an image from the digital data output by the image input unit, and calculating edge information comprising a grade and a direction of a slope of the edge;

a filter information generation unit generating filter information stored in the recording unit based on the edge information calculated by the edge information calculation unit;

a smoothing unit smoothing all of the digital data output by the image input unit based on the filter information generated by the filter information generation unit; and a recording unit for storing the smoothed digital data.

14. The image processing method according to claim 1, further comprising inputting image data and converting image data into the digital data.

15. The image processing method according to claim 1, wherein a shape of a smoothing range depends on the grade of the slope.

16. The image processing method according to claim 1, wherein the preset filter comprises a smoothing range for said smoothing of all of the digital data and wherein a shape of the smoothing range depends on the grade of the slope.

17. The image processing method according to claim 1, wherein the filter information is selected from plural sets of filter information, whose elliptical shapes of a smoothing elliptical ranges are different in shape and inclination from each other, based on the grade and the direction of the slope.

18. The image processing method according to claim 5, wherein the filter information defines a smoothing elliptical range, and at the filter information selection step, an elliptical shape of the smoothing elliptical range and inclination of the elliptical shape are determined based on the grade and the direction of the slope.

* * * * *